(12) United States Patent
O'Bryant

(10) Patent No.: US 10,806,300 B2
(45) Date of Patent: Oct. 20, 2020

(54) FOLDABLE GRILL BOX

(71) Applicant: Kevin O'Bryant, Anderson, IN (US)

(72) Inventor: Kevin O'Bryant, Anderson, IN (US)

(*) Notice: Subject to any disclaimer, the term of this patent is extended or adjusted under 35 U.S.C. 154(b) by 82 days.

(21) Appl. No.: 16/260,268

(22) Filed: Jan. 29, 2019

(65) Prior Publication Data
US 2020/0237151 A1 Jul. 30, 2020

(51) Int. Cl.
A47J 37/07 (2006.01)

(52) U.S. Cl.
CPC .... *A47J 37/0763* (2013.01); *A47J 2037/0777* (2013.01)

(58) Field of Classification Search
CPC .............. A47J 37/0763; A47J 2037/0777
See application file for complete search history.

(56) References Cited

U.S. PATENT DOCUMENTS

| | | | | |
|---|---|---|---|---|
| 2,061,336 A * | 11/1936 | Stuart | ..................... | F24B 1/205 126/25 R |
| 4,569,327 A * | 2/1986 | Velten | ................. | A47J 37/0763 126/25 A |
| 4,598,690 A * | 7/1986 | Hsu | .......................... | F24C 1/16 126/25 R |
| 4,971,045 A | 11/1990 | Probst | | |
| 5,503,138 A * | 4/1996 | Chang | ................. | A47J 37/0763 126/25 R |
| 6,973,927 B1 * | 12/2005 | Stewart | ............... | A47J 37/0786 126/201 |
| 7,856,924 B1 * | 12/2010 | Stihi | .................... | A47J 37/0704 126/25 A |
| D734,974 S | 7/2015 | Barford | | |
| 9,702,563 B2 | 7/2017 | Probst | | |
| 2008/0178864 A1 * | 7/2008 | Hoyles | ................. | A47J 37/0736 126/25 R |
| 2008/0264404 A1 * | 10/2008 | Hoyles | ................. | A47J 37/0736 126/25 R |
| 2013/0104744 A1 * | 5/2013 | Oi | ........................ | A47J 37/0786 99/421 H |
| 2014/0007860 A1 * | 1/2014 | Lu | ............................. | F24C 1/16 126/19 M |
| 2015/0068515 A1 | 3/2015 | Tan | | |
| 2016/0195276 A1 | 7/2016 | Calvin | | |

* cited by examiner

*Primary Examiner* — David J Laux

(57) ABSTRACT

A foldable grill box for portable grilling includes a plurality of box sides comprising a bottom side, a front side, a back side, a right side, and a left side. Each of the front side, the back side, the right side, and the left side has a bottom edge, a top edge, an inner face, and an outer face. The bottom side has a front edge, a back edge, a right edge, a left edge, a top face, and a bottom face. A plurality of hinges is coupled to the plurality of box sides to allow the plurality of box sides to move between an open and alternate closed position. A grill is selectively engageable with the plurality of box sides. The plurality of box sides is configured to house a fire and the grill is configured to function as a grilling surface.

7 Claims, 6 Drawing Sheets

FOLDABLE GRILL BOX

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98

The disclosure and prior art relates to portable grills and more particularly pertains to a new portable grill for portable grilling.

BRIEF SUMMARY OF THE INVENTION

An embodiment of the disclosure meets the needs presented above by generally comprising a plurality of box sides comprising a bottom side, a front side, a back side, a right side, and a left side. Each of the front side, the back side, the right side, and the left side has a bottom edge, a top edge, an inner face, and an outer face. The bottom side has a front edge, a back edge, a right edge, a left edge, a top face, and a bottom face. A plurality of hinges is coupled to the plurality of box sides. The plurality of hinges comprises a front hinge, a back hinge, a right hinge, and a left hinge. The front hinge is coupled to each of the bottom side and the front side. The back hinge is coupled to each of the bottom side and the back side. The right hinge is coupled to each of the bottom side and the right side, and the left hinge is coupled to each of the bottom side and the left side. The plurality of hinges allows the plurality of box sides to move between an open position having each of the plurality of box sides coplanar and an alternate closed position having each of the front side, the back side, the right side, and the left side being perpendicular to the bottom side to form an open-topped box. A grill that is selectively engageable with the plurality of box sides in the alternate closed position is coupled to the plurality of box sides. The plurality of box sides in the alternate closed position is configured to house a wood or charcoal fire and the grill is configured to function as a grilling surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
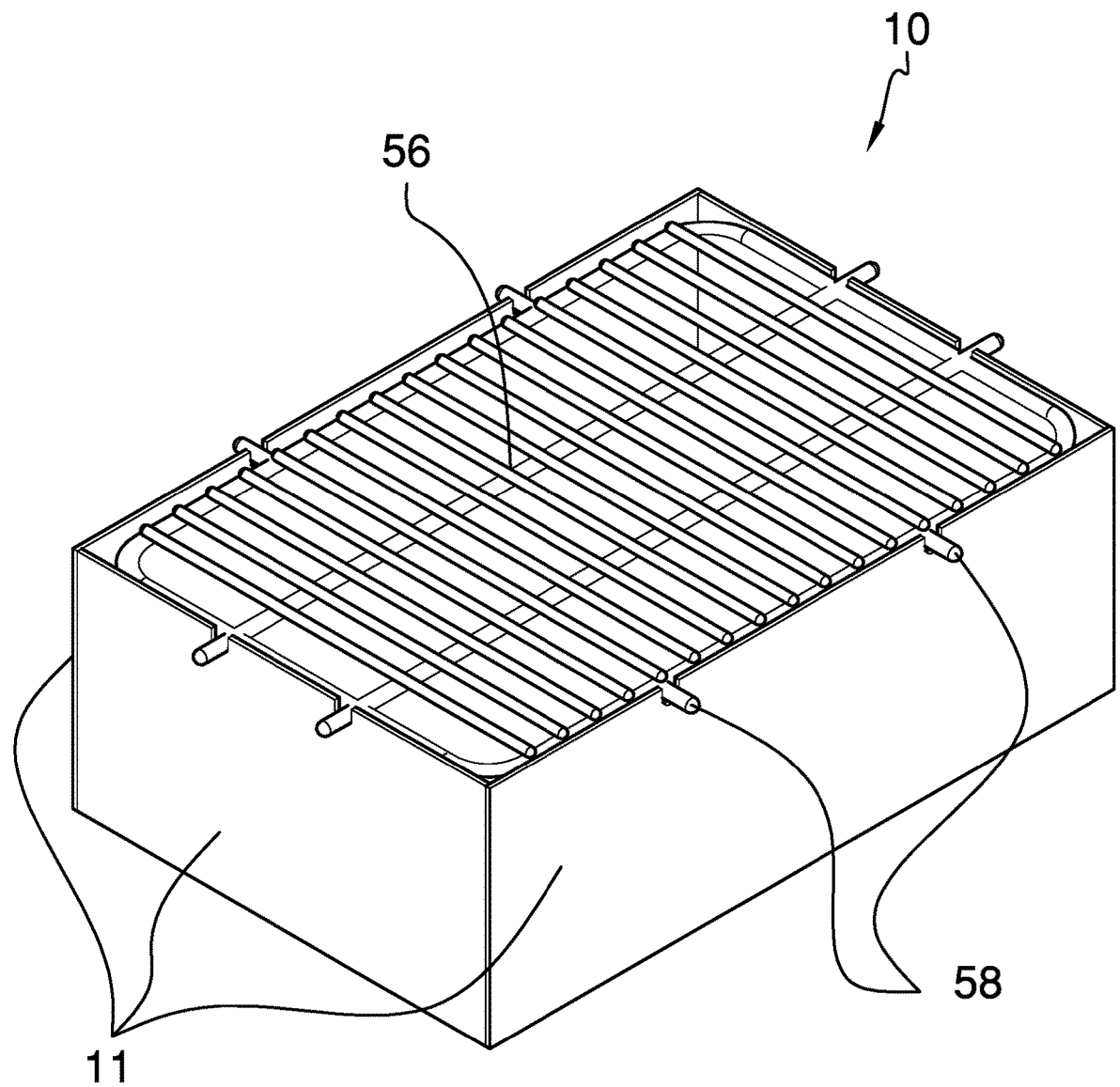
FIG. 1 is an isometric view of a foldable grill box according to an embodiment of the disclosure.
Figure 2:
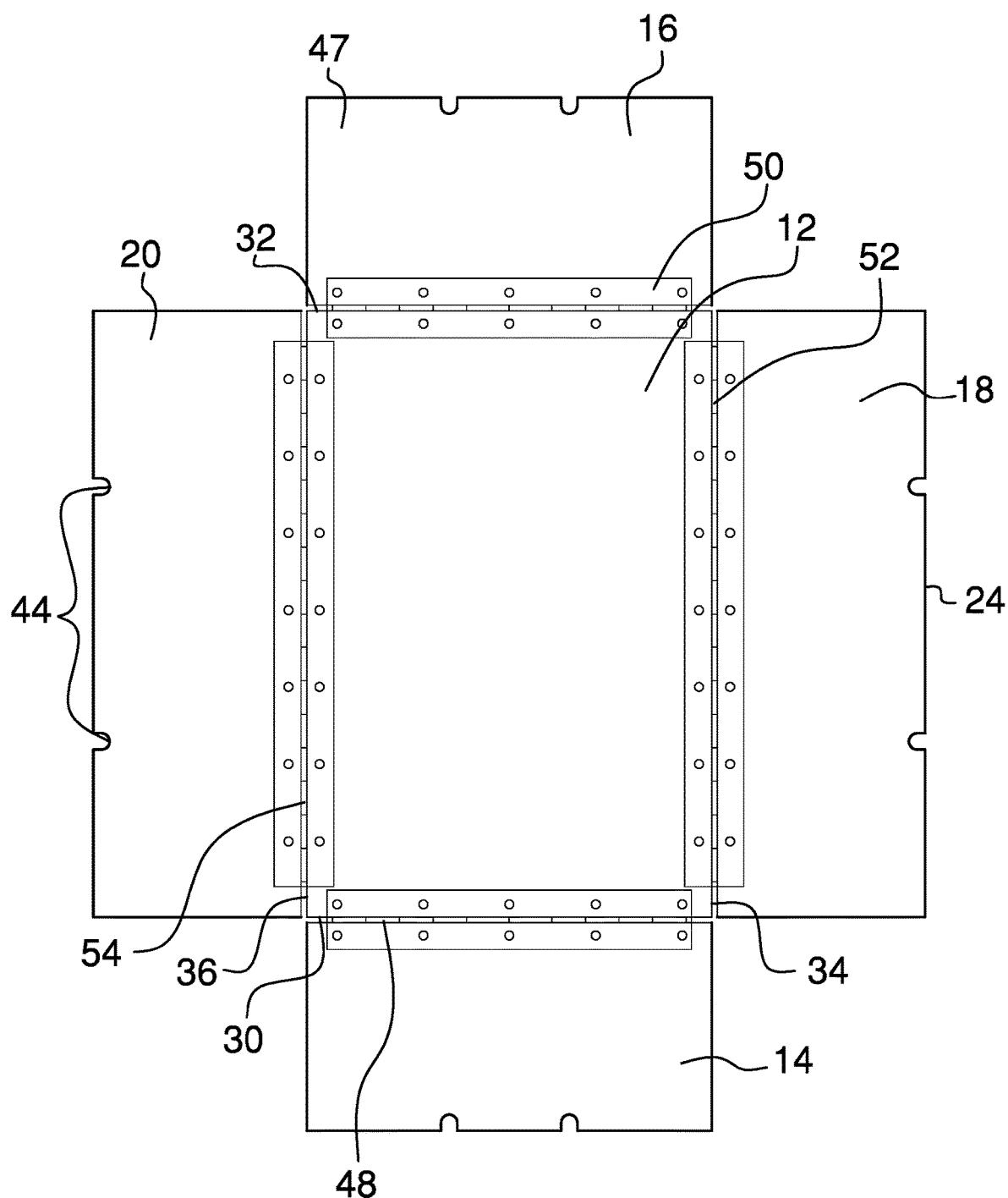
FIG. 2 is a top plan view of an embodiment of the disclosure.
Figure 3:
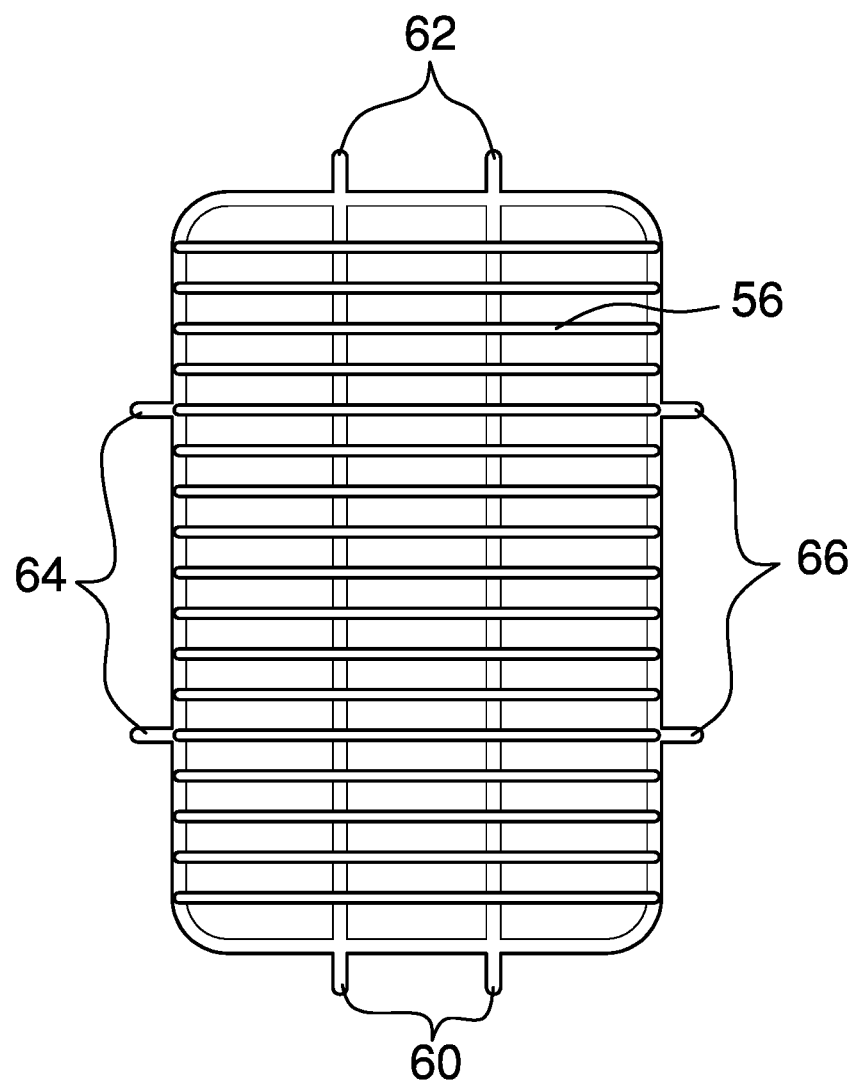
FIG. 3 is a detail view of an embodiment of the disclosure.
Figure 4:
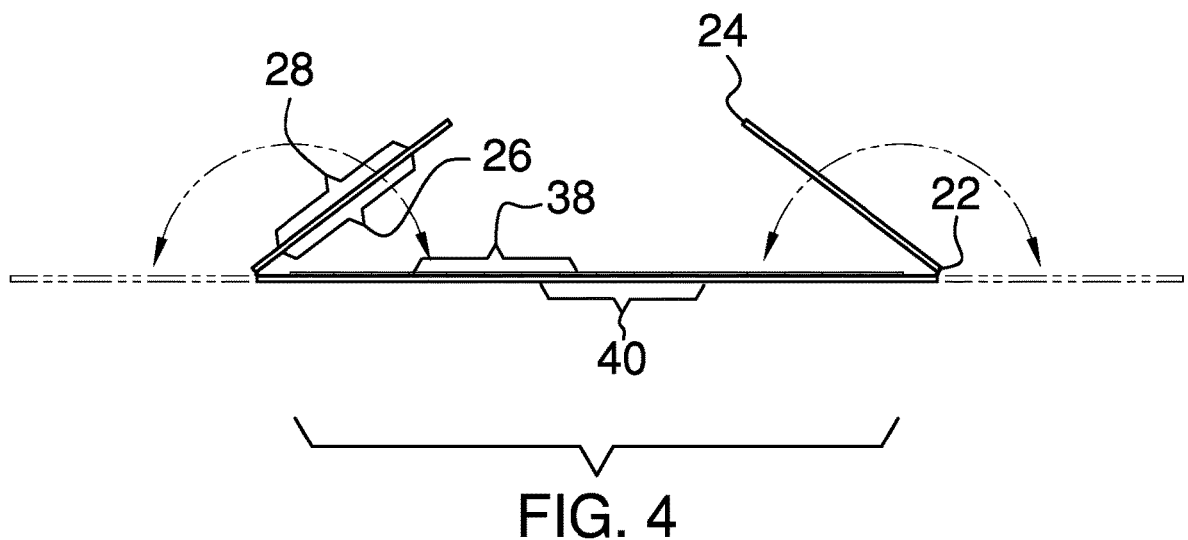
FIG. 4 is a side elevation view of an embodiment of the disclosure.
Figure 5:
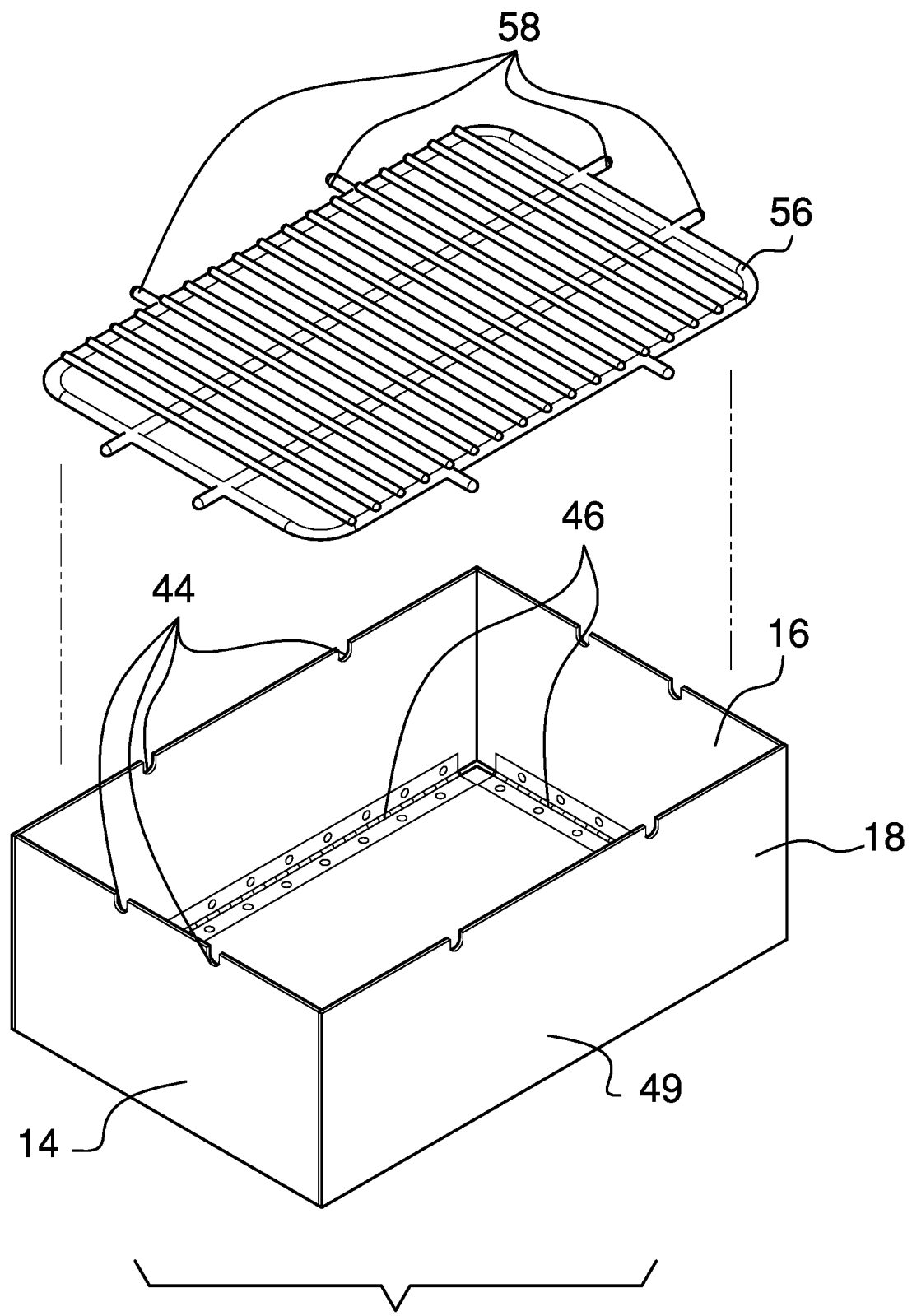
FIG. 5 is an isometric view of an embodiment of the disclosure.
Figure 6:
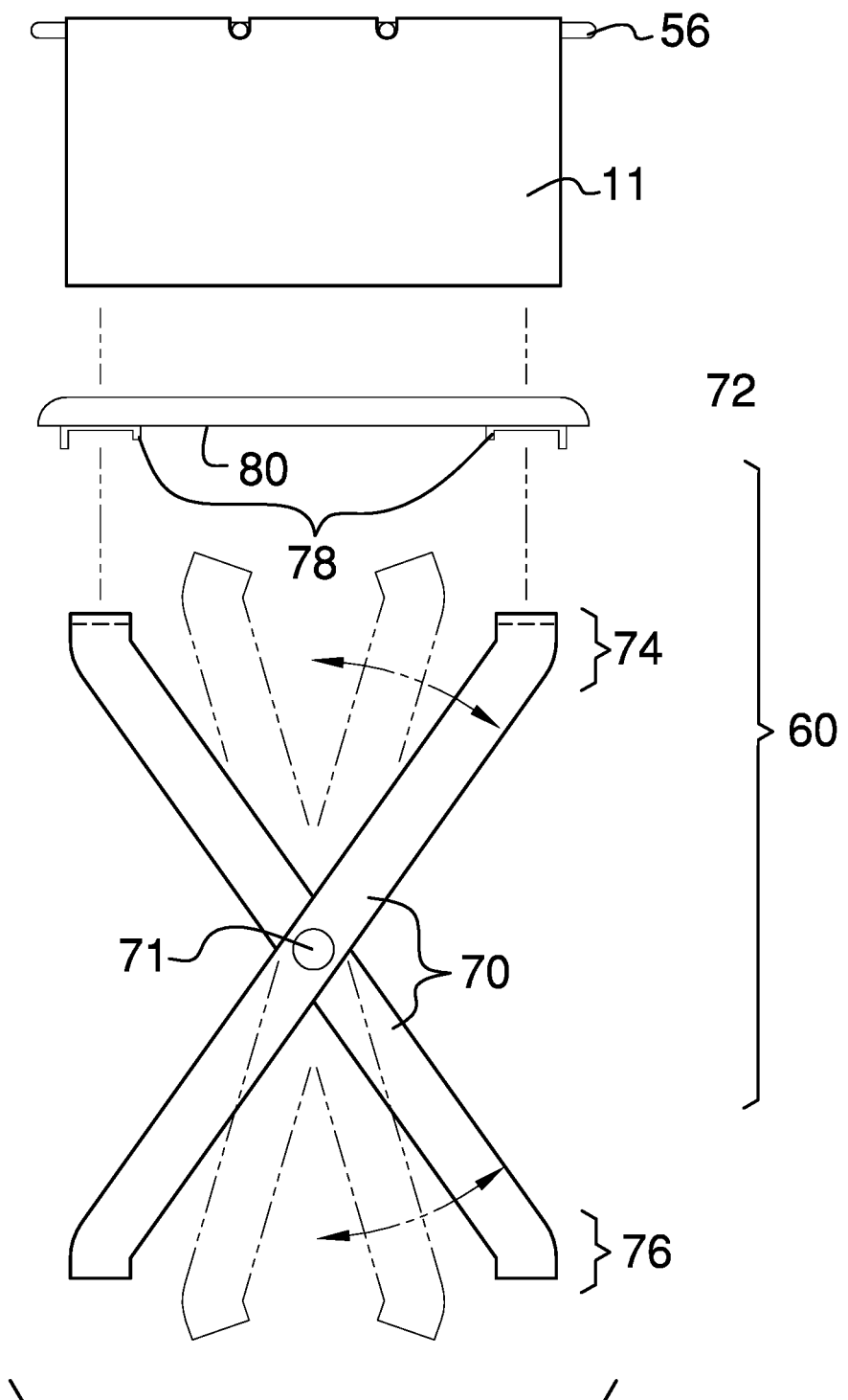
FIG. 6 is a side elevation view of an embodiment of the disclosure.

With reference now to the drawings, and in particular to FIGS. 1 through 6 thereof, a new portable grill embodying the principles and concepts of an embodiment of the disclosure and generally designated by the reference numeral 10 will be described.

As best illustrated in FIGS. 1 through 6, the foldable grill box 10 generally comprises a plurality of box sides 11 comprising a bottom side 12, a front side 14, a back side 16, a right side 18, and a left side 20. Each of the front side 14, the back side 16, the right side 18, and the left side 20 has a bottom edge 22, a top edge 24, an inner face 26, and an outer face 28. The bottom side 12 has a front edge 30, a back edge 32, a right edge 34, a left edge 36, a top face 38, and a bottom face 40. The top edge 42 of each of the front side 14, the back side 16, the right side 18, and the left side 20 has a plurality of notches 44. The plurality of notches 44 may be a pair of notches. A plurality of hinges 46 is coupled to the plurality of box sides. The plurality of hinges 46 comprise a front hinge 48, a back hinge 50, a right hinge 52, and a left hinge 54. The front hinge 48 is coupled to each of the bottom side 12 and the front side 14, the back hinge 50 is coupled to each of the bottom side 12 and the back side 16, the right hinge 52 is coupled to each of the bottom side 12 and the right side 18, and the left hinge 54 is coupled to each of the bottom side 12 and the left side 20. The plurality of hinges 46 is coupled to the top face 38 of the bottom side 12 and the inner face 26 of each of the front side 14, the back side 16, the right side 18, and the left side 20. The plurality of hinges 46 allow the plurality of box sides 11 to move between an open position 47 having each of the plurality of box sides 11 coplanar and an alternate closed position 49 having each of the front side 14, the back side 16, the right side 18, and the left side 20 being perpendicular to the bottom side 12 to form an open-topped box. A grill 56 that has a plurality of extensions 58 is coupled to the plurality of box sides 11. The plurality of extensions 58 is selectively engageable with the plurality of notches 44 with the plurality of box sides 11 in the alternate closed position 49. The plurality of extensions 58 comprise a pair of front extensions 60, a pair of back extensions 62, a pair of left extensions 64, and a pair of right extensions 66. The grill 56 may have rounded corners. A stand 68 comprises a pair of foldable legs 70 and a table top 72 that is configured to support the plurality of box sides 11 in the alternate closed position 49. The pair of foldable legs 70 has a central axis 71, each of the pair of legs 70 having a top extension 74 and a bottom extension 76. The table top 72 has a pair of mounts 78 coupled to an underside 80 thereof that selectively receive the top extension 74 of the pair of foldable legs 70.

In use, the plurality of box sides 11 is placed in the alternate closed position 49 and the grill 56 is inserted with the plurality of extensions 58 within the plurality of notches 44. The plurality of box sides 11 in the alternate closed position 49 is configured to house a wood or charcoal fire and the grill 56 is configured to function as a grilling surface.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A foldable grill box comprising:
   a plurality of box sides, the plurality of box sides comprising a bottom side, a front side, a back side, a right side, and a left side, each of the front side, the back side, the right side, and the left side having a bottom edge, a top edge, an inner face, and an outer face, the bottom side having a front edge, a back edge, a right edge, a left edge, a top face, and a bottom face;
   a plurality of hinges coupled to the plurality of box sides, the plurality of hinges comprising a front hinge, a back hinge, a right hinge, and a left hinge, the front hinge being coupled to each of the bottom side and the front side, the back hinge being coupled to each of the bottom side and the back side, the right hinge being coupled to each of the bottom side and the right side, and the left hinge being coupled to each of the bottom side and the left side, the plurality of hinges allowing the plurality of box sides to move between an open position having each of the plurality of box sides coplanar and an closed position having each of the front side, the back side, the right side, and the left side being perpendicular to the bottom side to form an open-topped box; and
   a grill coupled to the plurality of box sides, the grill being selectively engageable with the plurality of box sides in the closed position;
   wherein the plurality of box sides in the closed position is configured to house a wood or charcoal fire and the grill is configured to function as a grilling surface; and,
   wherein the top edge of each of the front side, the back side, the right side, and the left side having a plurality of notches and the grill having a plurality of extensions, the plurality of extensions being selectively engageable with the plurality of notches.

2. The foldable grill box of claim 1 further comprising the plurality of notches being a pair of notches and the plurality of extensions comprising a pair of front extensions, a pair of back extensions, a pair of left extensions, and a pair of right extensions.

3. The foldable grill box of claim 1 further comprising the plurality of hinges being coupled to the top face of the bottom side and the inner face of each of the front side, the back side, the right side, and the left side.

4. The foldable grill box of claim 1 further comprising the grill having rounded corners.

5. The foldable grill box of claim 1 further comprising a stand, the stand comprising a pair of foldable legs and a table top, the table top being configured to support the plurality of box sides in the closed position.

6. The foldable grill box of claim 5 further comprising the pair of foldable legs having a central axis, each of the pair of legs having a top extension and a bottom extension, the table top having a pair of mounts coupled to an underside thereof, the pair of mounts selectively receiving the top extension of the pair of legs.

7. A foldable grill box comprising:
   a plurality of box sides, the plurality of box sides comprising a bottom side, a front side, a back side, a right side, and a left side, each of the front side, the back side, the right side, and the left side having a bottom edge, a top edge, an inner face, and an outer face, the bottom side having a front edge, a back edge, a right edge, a left edge, a top face, and a bottom face, the top edge of each of the front side, the back side, the right side, and the left side having a plurality of notches, the plurality of notches being a pair of notches;
   a plurality of hinges coupled to the plurality of box sides, the plurality of hinges comprising a front hinge, a back hinge, a right hinge, and a left hinge, the front hinge being coupled to each of the bottom side and the front side, the back hinge being coupled to each of the bottom side and the back side, the right hinge being coupled to each of the bottom side and the right side, and the left hinge being coupled to each of the bottom side and the left side, the plurality of hinges being coupled to the top face of the bottom side and the inner face of each of the front side, the back side, the right side, and the left side, the plurality of hinges allowing the plurality of box sides to move between an open position having each of the plurality of box sides coplanar and an closed position having each of the front side, the back side, the right side, and the left side being perpendicular to the bottom side to form an open-topped box;
   a grill coupled to the plurality of box sides, the grill having a plurality of extensions, the plurality of extensions being selectively engageable with the plurality of notches with the plurality of box sides in the closed position, the plurality of extensions comprising a pair of front extensions, a pair of back extensions, a pair of left extensions, and a pair of right extensions, the grill having rounded corners; and a stand, the stand comprising a pair of foldable legs and a table top, the table top being configured to support the plurality of box sides in the closed position, the pair of foldable legs having a central axis, each of the pair of legs having a top extension and a bottom extension, the table top having a pair of mounts coupled to an underside thereof, the pair of mounts selectively receiving the top extension of the pair of foldable legs;

wherein the plurality of box sides in the closed position is configured to house a wood or charcoal fire and the grill is configured to function as a grilling surface.

* * * * *